March 27, 1956

W. PECHY 2,739,556

SEAMING CHUCK FOR RECLOSURE CONTAINERS
WITH STRIPPING MEANS

Filed July 3, 1952

INVENTOR.
WILLIAM PECHY
BY Charles H. Gene
Leland R. McCann
George W. Reiber
ATTORNEYS March 27, 1956
W. PECHY
2,739,556
SEAMING CHUCK FOR RECLOSURE CONTAINERS WITH STRIPPING MEANS
Filed July 3, 1952
2 Sheets-Sheet 2
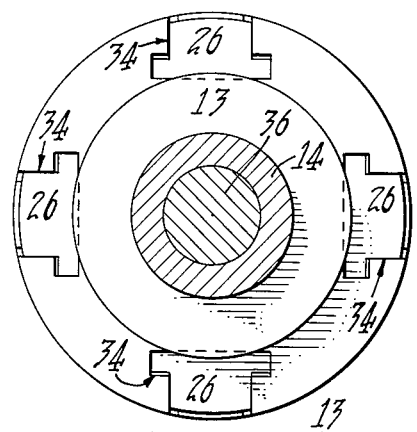
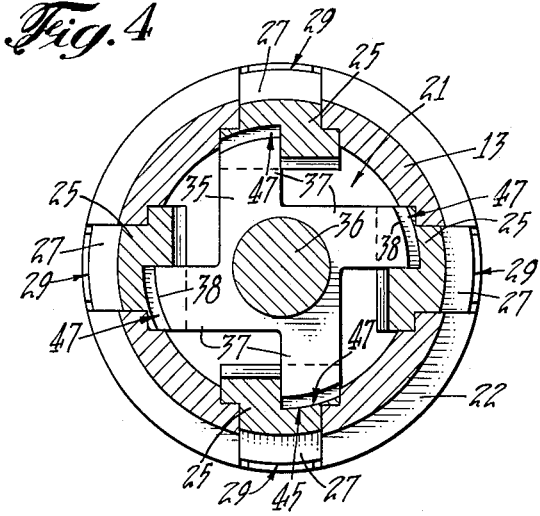
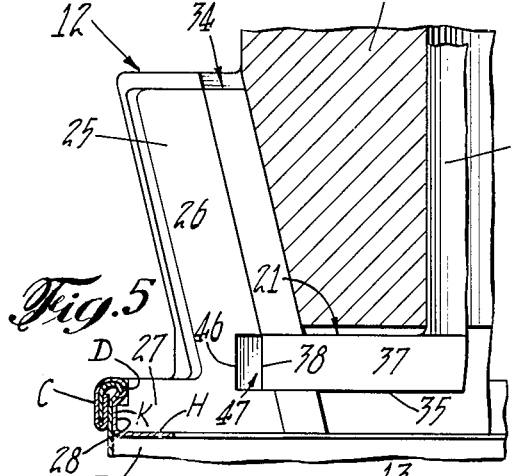
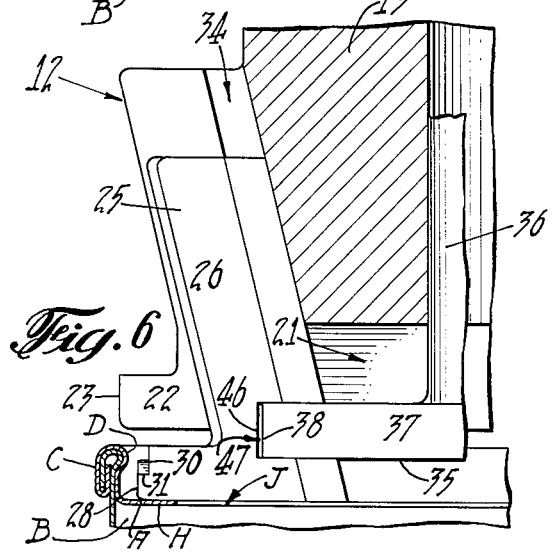
INVENTOR.
WILLIAM PECHY
BY Charles H. Ernie
Leland R. McCann
George W. Reiber
ATTORNEYS United States Patent Office 2,739,556
Patented Mar. 27, 1956

2,739,556

SEAMING CHUCK FOR RECLOSURE CONTAINERS WITH STRIPPING MEANS

William Pechy, Belmar, N. J., assignor to American Can Company, New York, N. Y., a corporation of New Jersey Application July 3, 1952, Serial No. 297,091

5 Claims. (Cl. 113—23)

The present invention relates to apparatus for producing containers or cans having inwardly projecting locking lugs formed in an end seam, and has particular reference to a seaming chuck having improved means for positively stripping the container from the chuck after the lugs have been formed.

The instant invention contemplates a seaming chuck particularly adapted for use in the manufacture of reclosure containers of the type illustrated in R. K. Pottle Patent 2,559,658 issued July 10, 1951 and entitled "Container" and as such constitutes an improvement over the mechanism disclosed in C. W. Heinle Patent 2,536,055 issued January 2, 1951 and entitled "Apparatus for Producing Containers."

In mechanisms of this type the inwardly projecting locking lugs of the container are produced simultaneously with the formation of the top end double seam by pressing the inner layers of the seam inwardly into suitably shaped mold recesses formed in the upper portion of the peripheral wall of the seaming chuck. As a result, the completed locking lugs overhang those portions of the peripheral chuck wall directly beneath the mold recesses and thus would permanently lock the chuck and container together if the chuck were made solid. In order to release the container from the chuck, however, the mold recesses are formed in die inserts which are mounted in the chuck and can be moved inwardly in order to clear the locking lugs.

In any type of double seaming operation, it is very desirable that the container be positively stripped from the seaming chuck after the seaming has been completed to prevent the possibility of having the container stick to the chuck due to frictional engagement between them. In manufacturing the container covered by the above mentioned Pottle Patent 2,559,658, the conventional type of knockout pad which engages against the center of the top end member of the container cannot conveniently be used since this central portion of the end member is cut away to provide an opening leaving only a narrow annular top wall or ring.

The present invention provides a solution to this problem by having die inserts, which engage this annular wall and which contain the mold recesses, function also as knockouts to strip the container from the chuck. To accomplish this, the inserts are moved along a downwardly converging path of travel. The inward component of this movement is utilized to move the inserts from beneath the locking lugs to release the container, while the downward component is utilized to positively strip the container from the chuck. Thus there is provided with a minimum of working parts a chuck construction which meets all the requirements for a rapid and dependable double seaming, lug forming and stripping operation.

An object of the invention, therefore, is the provision of a seaming chuck incorporating die inserts which permit the formation of inwardly projecting locking lugs in the end seam of a reclosure container, the inserts being slideable in a direction downwardly and inwardly with respect to the axis of the chuck to release and positively remove the container from the chuck after the seaming operation has been completed.

Another object is the provision of a seaming chuck of simple construction with a minimum of operating parts and wherein the movable die inserts are readily removable from the chuck for replacement or repair.

Numerous other objects and advantages of the invention will be apparent as it is better understood from the following description, which, taken in connection with the accompanying drawings, discloses a preferred embodiment thereof.

Referring to the drawings.

Figure 1:
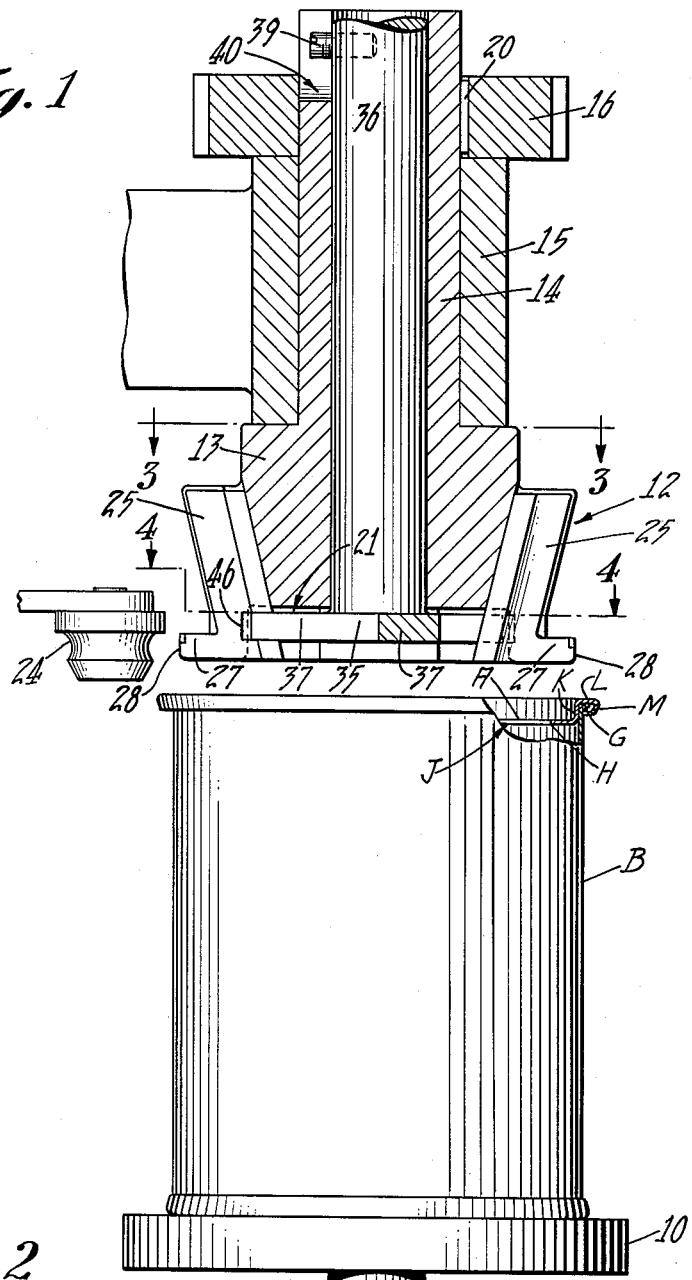
Figure 1 is a side view partly in section of the apparatus embodying the instant invention, with parts broken away.

Figs. 3 and 4 are horizontal sections taken substantially along the lines 3—3 and 4—4 in Fig. 1, respectively;

Figs. 5 and 6 are enlarged vertical sectional details of portions of the container and the apparatus shown in Fig. 1, with parts broken away and parts in different positions incidental to stripping the container from the apparatus after the conclusion of the seaming operation;

Fig. 7 is a view similar to Fig. 4 but showing the parts of the apparatus positioned to permit removal of the die inserts, only two of which are shown; and Fig. 8 is a perspective view of one of the die inserts used in the apparatus.

Figure 2:
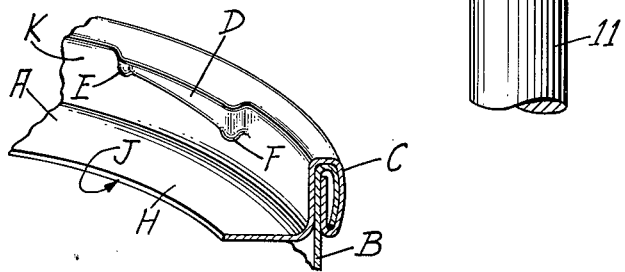
Fig. 2 is a fragmentary perspective view of the top of a reclosure can showing a portion of the end seam and one of the cover locking lugs made with the apparatus illustrated in Fig. 1.

As a preferred or exemplary embodiment of the instant invention, the drawings illustrate a seaming chuck adapted for use in a can seaming machine which secures a sheet metal end member or ring A (Fig. 1) to a tubular sheet metal can body B in a multiple layer double seam C (Figs. 2, 5 and 6) by interfolding adjacent flange portions of these parts while simultaneously forming in the inner layers of the seam C circumferentially spaced, inwardly projecting inclined locking lugs or interrupted threads D having locking nodes E and F formed at each end of the thread (see Fig. 2). These locking lugs or threads D are utilized to hold in place on the can a cover member (not shown) which is provided with a corresponding number of outwardly projecting lugs or threads.

As shown in Fig. 1, the body B, which is preferably but not necessarily cylindrical in shape, is initially formed at its upper end with an outwardly flaring annular flange G. The end member or ring A fits within the open mouth of the body and is formed with a narrow countersunk annular wall H which defines a central dispensing and filling opening J and merges into an upright countersink wall K which in turn merges into a horizontal flange L. The flange L terminates in a curled edge M and may if desired carry a sealing gasket (not shown) to make the ultimate double seam hermetic.

The can body B with the end member A in place thereon is placed on a rotatable lifter pad 10 mounted on the upper end of a vertical stem 11 forming a part of the seaming machine. The stem 11 is raised and lowered in synchronism with the other working parts of the seaming machine in any suitable manner. When the lifter pad 10 is moved to its raised position by the stem 11, the end member A engages against the bottom surface of a chuck 12 which rotates on a vertical axis and which fits down into the countersunk portion of the end member A and presses against the annular wall H for holding the flange L of the end member tightly against the flange G of the can body B during the seaming operation which follows.

The chuck 12 comprises a body member 13 formed on the lower end of a sleeve 14 which is journaled in a bearing 15 which may be a part of the main frame of the seaming machine. A drive gear 16 is secured to the upper end of the sleeve 14 by a key 20 and is driven in any suitable manner to rotate the chuck 12 and thus the can end member A and body B during the seaming operation. The lower portion of the chuck body 13 is hollowed out to form a circular recess 21 (Figs. 1, 4 and 6) which is surrounded by an annular outwardly extending, horizontal flange 22, having an outer peripheral edge wall 23 dimensioned to snugly fit into the end member A. The edge wall 23 (Fig. 6) of the flange 22 engages the upright countersink wall K of the end member A and backs up this countersink wall K and the upper portion of the can body B during the formation of the interfolded double seam C.

The formation of the double seam C preferably is effected as the can rotates, by conventional first and second operation seaming rollers 24 (only one of these rollers being shown in Fig. 1 of the drawings for the sake of simplicity) which are suitably mounted adjacent the chuck 12 and brought into seaming contact with the flange L and curl M of the can end member A in order to reshape and interfold the extending flange parts of the can end A and body B in the usual manner. It should be understood, however, that the chuck embodying the instant invention is also suitable for use in seaming machines of the type in which the can stands still while the seaming rollers revolve around it.

In order to obtain the formation of the locking lugs or threads D simultaneously with the formation of the double seam C, the chuck 12 is provided with a plurality of die inserts or blocks 25 arranged around the chuck 12 in accordance with the desired positioning of the lugs D. In the present embodiment of the invention, four such die inserts 25 are shown spaced equally around the periphery of the chuck. Each of the die blocks 25 comprises an inclined T-shaped body member 26 (Figs. 3 and 8) having a horizontally outwardly projecting foot or flange 27. The foot 27 is substantially the same thickness as the chuck flange 22 and is provided with a peripheral edge wall 28 which is of the same curvature as the peripheral chuck flange wall 23 and normally forms a continuation thereof to provide a continuous backing-up surface for the formation of the double seam C (see Figs. 3 and 4).

The upper portion of the outer peripheral wall 28 of each die insert 25 is formed with a mold recess 29 which is shaped to correspond to the desired shape of the locking lug D. In the illustrated form of the invention, the mold recess includes a back wall 30, an inclined locking surface wall 31 and locking node walls 32, 33 which are formed at the ends of the inclined locking surface wall 31 (see Fig. 8).

The inclined T-shaped body member 26 of each die insert 25 is disposed in and operates in a correspondingly upright T-shaped slideway 34 formed in the chuck body 13. The slideways 34 are all uniformly inclined inwardly and downwardly with respect to the axis of the chuck 12 and thus converge towards a point disposed below the chuck.

The die inserts 25 are held in normal, seaming position (Figs. 1 and 5) with their flanges 27 level with the chuck flange 22 by a plate or spider 35 (Figs. 1 and 4) mounted at the lower end of a reciprocable actuating rod 36 which extends up through and rotates with the chuck body 13 and sleeve 14. The spider 35 is disposed within the chuck recess 21 and is formed with four radially offset prongs 37 which terminate in curved peripheral edge walls 38 which just clear the side wall of the chuck recess 21.

In normal operation, the rod 36 is splined to the chuck 12 by a screw 39 (Fig. 1) which operates in a slot 40 formed in the upper end of the sleeve 14 and thus maintains the spider 35 in its operating position as shown in Figs. 1, 4, 5, and 6, in which each prong 37 is disposed within a horizontal groove 45 formed on the inside of each die insert 25 and extending for about half of the width of the die insert. The height of the groove 45 is substantially the same as the thickness of the prong 37 to eliminate play between the prong and the die insert 25.

Each groove 45 is formed with a substantially arcuate vertical wall 46 which is normally spaced away from the peripheral edge wall 38 of the spider prong 37 to create a gap 47 which makes it possible to move the inserts downwardly and to retain them in the slideway in the normal operation of the machine without interference with the spider 35. To disassemble the chuck 12, it is only necessary to remove the screw 39, after which the rod 36 can be rotated in a counterclockwise direction (as viewed in Fig. 4) sufficiently to move the spider prongs 37 out of the recesses 45 (see Fig. 7) to release the die inserts 26 which can then be slid downwardly out of the chuck head 13 to facilitate replacement or repair.

During the seaming operation, the seaming rollers interfold the flanges G and L and compress these interfolded flanges together with the countersink wall K of the end member A and the upper portion of the can body B, against the edge walls 23 and 28 of the chuck flange 22 and die inserts 25, respectively, to form the double seam C. This compression of the seam C is substantially uniform except at the mold recesses 29 where the upper portions of the inner layers of the seam are forced into the mold recesses to form the inwardly projecting locking lugs D (see Fig. 5).

At the completion of this seaming and lug forming operation, the seaming rollers are moved outwardly and the actuating rod 36 and the lifter pad 10 are moved downwardly in synchronism to strip the can from the chuck flange 22 and thereby release it for removal from the lifted pad. This vertical movement of the rod 36 may be performed in the usual manner by suitable operating means applied to the upper end of the rod. The movement of the rod 36 is transmitted to the die inserts 25 by the spider prongs 37 and thus the inserts 25 are moved downwardly and inwardly simultaneously in the slideways 34. As they move downwardly, the bottom portions of the inserts 25 press against the annular wall H of the can end member A and thus positively strip the can from the chuck 12.

As the die inserts 25 move inwardly because of the incline of the slideways, the peripheral walls 28 containing the mold recesses 29, are drawn from under the lugs D in the seam C so that at the end of the downward stroke of the rod 36, the peripheral walls 28 are clear of the lugs D (see Fig. 6). The can is thereby fully released from the chuck to continue its downward travel with the lifter pad 10 without interference until the lifter pad reaches the bottom of its stroke, so that the can may be removed to any suitable place of deposit. Upon release of the can from the chuck 12, the rod 36 is moved up to return the die inserts 25 to their original positions with their projecting feet 27 at the level of the flange 22 of the chuck to complete the peripheral wall 23 for a seaming and lug forming operation on a subsequent can.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for producing reclosure containers by securing a can end member to a can body member in an end seam while simultaneously forming inwardly projecting locking lugs in said end seam, the combination of a chuck having an axis and a peripheral backing-up wall for engaging within said end member, an end seam forming element disposed opposite said peripheral backing-up wall and cooperable therewith to unite said can end and body members in said end seam, a slideway disposed in said chuck, said slideway being inclined downwardly and inwardly with respect to the axis of said chuck, a die insert slideably disposed in said slideway and having a periperal edge wall with a mold recess therein into which a portion of said end seam is projected to form a said locking lug, and a bottom portion on said die insert engageable with an upper surface of said can end member for stripping the container from said chuck, whereby said insert is movable downwardly and inwardly along said slideway to engage said bottom portion of the insert with the end member of the container to strip said container from said chuck simultaneously to disengage and release said edge wall and its mold recess from said locking lug.

2. In an apparatus for producing reclosure containers by securing a can end member to a can body member in an end seam while simultaneously forming inwardly projecting locking lugs in said end seam, the combination of a chuck having an axis and a peripheral backing-up wall for engaging within said end member, an end seam forming element disposed opposite said peripheral backing-up wall and cooperable therewith to unite said can end and body members in said end seam, a slideway disposed in said chuck, said slideway being inclined downwardly and inwardly with respect to the axis of said chuck, a die insert slideably disposed in said slideway and having an outer peripheral wall which forms a continuation of the peripheral backing-up wall of said chuck, the peripheral wall of said die insert having formed therein a mold recess into which a portion of said end seam is projected to form a said locking lug, said die insert also being formed with a groove which opens interiorly of said chuck, and means axially movable relative to said chuck and engaging within said groove for retaining said die insert in said slideway, whereby said die insert is movable along said slideway for stripping said container from said chuck while simultaneously providing clearance between said die insert and said locking lug.

3. In an apparatus for producing reclosure containers by securing a can end member to a can body member in an end seam while simultaneously forming inwardly projecting locking lugs in said end seam, the combination of a chuck having an axis and a peripheral backing-up wall for engaging within said end member, an end seam forming element disposed opposite said peripheral backing-up wall and cooperable therewith to unite said can end and body members in said end seam, a plurality of radially spaced downwardly converging slideways disposed in said chuck, said slideways being inclined downwardly and inwardly with respect to the axis of said chuck, a die insert slideably mounted in each of said slideways and having an outer peripheral wall which forms a continuation of the peripheral backing-up wall of said chuck, the peripheral wall of said die insert having formed therein a mold recess into which a portion of said end seam is projected to form a said locking lug, said die insert also being formed with a groove which opens interiorly of said chuck, and vertically movable means including prongs engaging within said grooves for retaining said die inserts in said slideways, whereby said die inserts are movable downwardly and inwardly from said backing-up wall to strip said container from said chuck after said formation of locking lugs and simultaneously to clear said die inserts from said locking lugs, said prongs being also disengageable from said grooves to release said die inserts from said slideways to facilitate replacement or repair.

4. In an apparatus for producing reclosure containers by securing a can end member to a can body member in an end seam while simultaneously forming inwardly projecting locking lugs in said end seam, the combination of a chuck having an axis and a peripheral backing-up wall for engaging within said end member, an end seam forming element disposed opposite said peripheral backing-up wall and cooperable therewith to unite said can end and body members in said end seam, a die insert having an outer peripheral wall with a mold recess formed therein and into which a portion of said end seam is projected to form a said locking lug, said die insert being mounted in said chuck for reciprocation in a path converging downwardly toward said axis of the chuck and having a groove opening interiorly of said chuck, a prong engaged in said groove and movable with said die insert to retain the insert longitudinally in its said mounting in the chuck, whereby said die insert is movable downwardly and inwardly with respect to the axis of said chuck for positively striping said container from said chuck while simultaneously providing clearance between said die insert and said locking lug, and locking means for locking said prong against displacement from said groove during use and for unlocking said prong so that said prong may be withdrawn from the groove for removal and replacement of said die insert.

5. In an apparatus for forming inwardly projecting lugs in an end seam of a container, the combination of a chuck having a peripheral backing-up wall engageable with the inner wall of the end seam of a container, an end seam forming element disposed opposite said peripheral backing-up wall and cooperable therewith to form said end seam, a plurality of inclined slideways formed in said chuck and converging downwardly toward the axis of the chuck; a die insert slideably mounted in each of said slideways and having an edge wall which normally forms a continuation of said peripheral wall of the chuck, said edge wall having formed therein a mold recess into which a portion of said end seam is projected to form a said lug, each of said inserts also having a lower portion engageable with the container end member and an inside portion formed with a groove which opens interiorly of said chuck; and means mounted centrally in said chuck for axial reciprocation therein, said axially reciprocable means including outwardly extending prongs engageable in said insert grooves, whereby said inserts are movable simultaneously inwardly and downwardly along said slideways, said inward movement of the inserts releasing their edge walls from the formed lugs on the container end seam, and said downward movement of the inserts stripping the container from said chuck.

References Cited in the file of this patent

UNITED STATES PATENTS

| 318,088 | Cooper | May 19, 1885 |
| 1,585,820 | Baum | May 25, 1926 |
| 2,447,525 | Nordquist | Aug. 24, 1948 |
| 2,536,055 | Heinle | Jan. 2, 1951 |
| 2,626,581 | Almgren | Jan. 27, 1953 |

FOREIGN PATENTS

| 233,602 | Great Britain | May 14, 1925 |
| 421,167 | Great Britain | Dec. 14, 1934 |